UNITED STATES PATENT OFFICE.

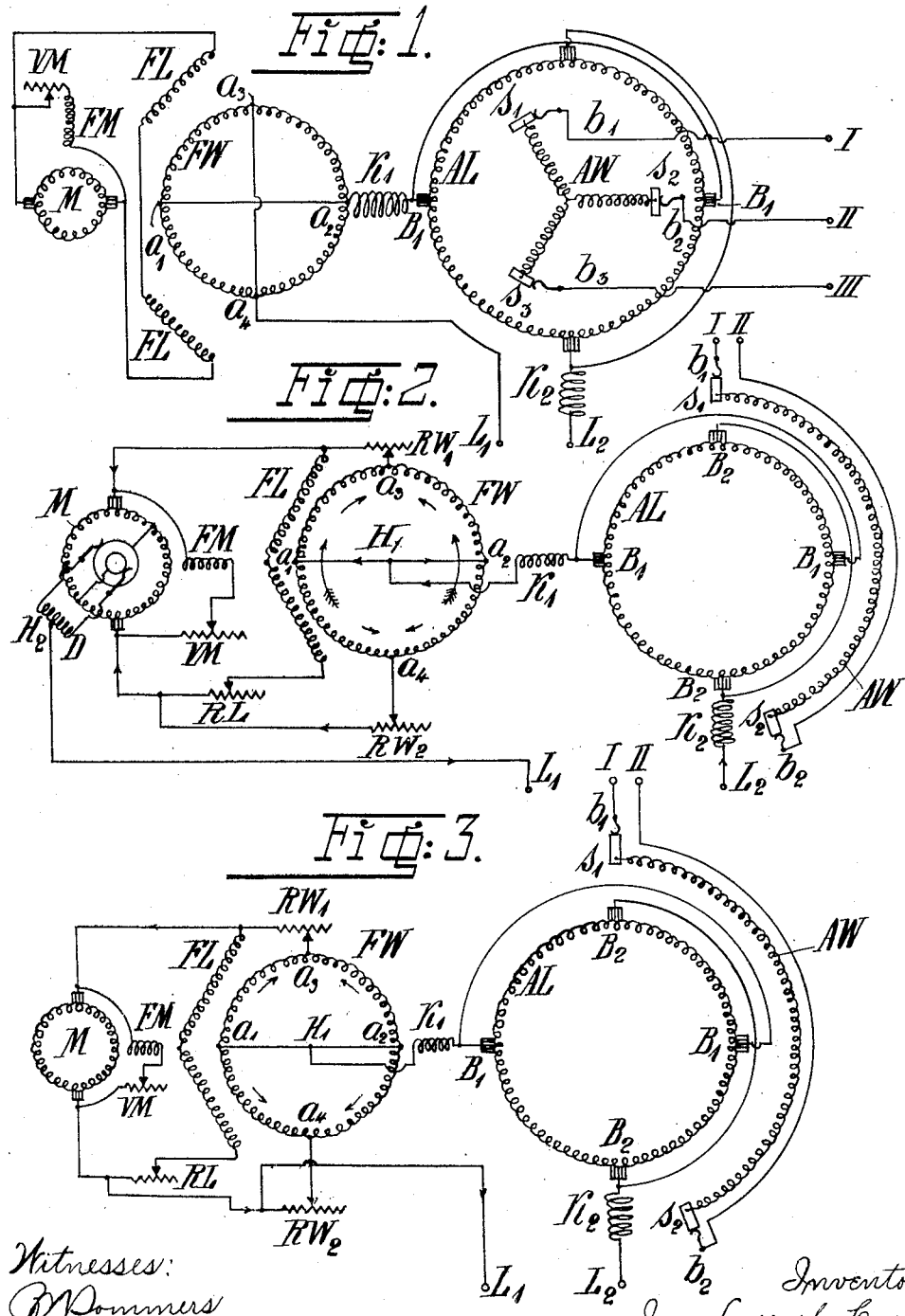

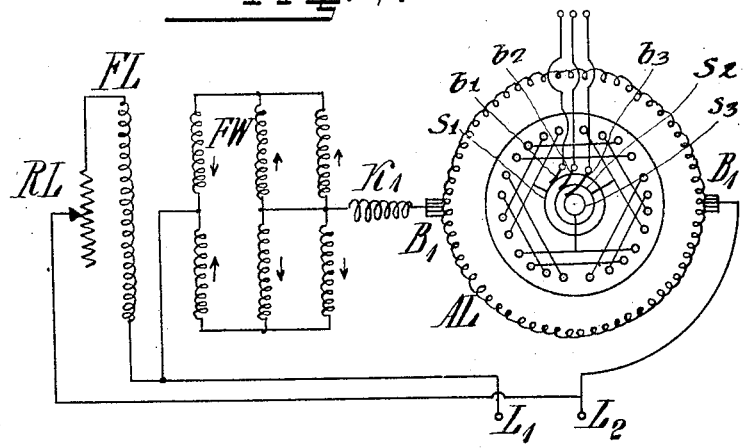
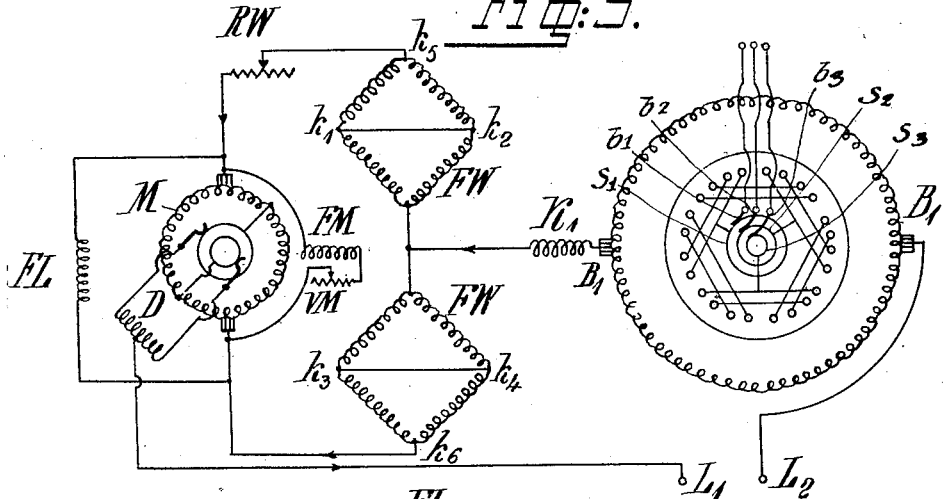
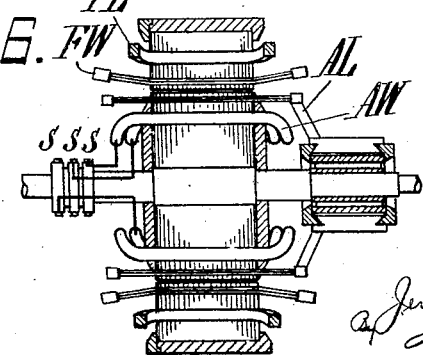

JENS LASSEN LA COUR, OF VESTERÅS, SWEDEN.

DOUBLE-POLE ROTARY CONVERTER.

1,263,437.      Specification of Letters Patent.     Patented Apr. 23, 1918.

Application filed April 23, 1914. Serial No. 833,887.

*To all whom it may concern:*

Be it known that I, JENS LASSEN LA COUR, a citizen of the Kingdom of Sweden, residing at Vesterås, Sweden, have invented new and useful Improvements in Double-Pole Rotary Converters, of which the following is a specification.

This invention relates to improvements in dynamo electric machinery in which an alternating current machine and a direct current machine are so incorporated into one machine as to provide what may be termed a double pole converter also applicable for use as a double current machine; the machine, which has two different kinds of fields having different numbers of poles, is mainly for use as a converter, but may be used to generate two different kinds of current. The direct current voltage of the machine is quite independent of the alternating current voltage, and is adapted to be regulated at will. The windings of the respective machines are, as stated, carried out with different numbers of poles and these numbers usually have a ratio of one to two. Obviously the machine may be used as a motor supplied with both alternating and direct current.

The alternating current machine may be of the asynchronous type or the auto-synchronous type; the term auto-synchronous is used to denote an asynchronous induction motor the secondary winding of which, after the motor has been started up as an induction motor, is adapted to be excited by direct current, thus changing the motor into a synchronous motor; in either case the alternating current machine is constructed as an ordinary induction motor and started up as such, but after reaching synchronous speed the secondary winding (except when carried out as a squirrel-cage winding) is excited with direct current, and the motor runs as a synchronous machine.

The primary winding of the alternating current machine is arranged on the rotor and the secondary winding on the stator, so that the latter is placed in the pole faces of the direct current machine; the field winding of the direct current machine and the secondary winding of the alternating current machine are well adapted for arrangement on the same stator core, the secondary winding being carried out in a single winding over the pole face either as a uniformly distributed coil or bar winding, and the field winding being carried out with a single coil per pole, after the manner of the field winding of a direct current machine with salient poles.

The machine can be started in the ordinary way as an induction motor with resistance in the secondary circuit, which in this case is arranged on the stator. After having been started the machine can, as stated, be converted into a synchronous machine and run as such by leading direct current into the secondary winding. The secondary winding may also be carried out as a squirrel-cage winding, in which case the machine may be started in any well known manner, for example, by means of an auto-starter or the like.

The machine may also be started from the direct current side, or by means of a special starting motor. When the alternating current machine is a single phase machine, it may be started from the alternating current side by means of an auxiliary primary winding constituting a split phase arrangement.

All these features are well known features of double pole converters, but such known machines have generally twice as many poles on the A. C. side as on the D. C. side, while the present invention has in view special improvements in double pole converters in which there may be twice as many poles on the D. C. side as on the A. C. side.

The first improvement is to combine the secondary winding of the A. C. machine with the compensating winding of the D. C. machine in order to get the simplest and most suitable winding arrangement on the stator, the smallest copper weight and the smallest copper losses.

In the accompanying drawing some constructional forms of the invention are illustrated diagrammatically.

Figure 1 shows an asynchronous converter provided with two windings on the stator, one of which is a continuous current field winding while the other is a secondary winding of the asynchronous machine and at the same time a compensating or commutating pole winding of the continuous current machine.

Fig. 2 shows a single-phase auto-synchronous converter.

Fig. 3 shows a modified form of the converter shown in Fig. 2.

Fig. 4 shows another form of a three-phase asynchronous converter.

Fig. 5 shows another form of an auto-synchronous converter.

Fig. 6 shows the essential features of a machine constructed according to the present invention.

Fig. 1 shows an asynchronous converter provided with two alternating current poles and four poles on the continuous current part. The rotor is provided, on the one hand, with a three-phase bi-polar alternating current winding AW connected by means of sliprings $s_1$ $s_2$ $s_3$ and brushes $b_1$ $b_2$ $b_3$ with the terminals I, II, III, of the three-phase circuit, and, on the other hand, with a four-pole continuous current armature winding AL connected through a commutator and brushes $B_1$ $B_1$ and $B_2$ $B_2$ with the terminals $L_1$ $L_2$ respectively of a continuous current circuit. $K_1$ $K_2$ indicate compensating or commutating pole-windings for the continuous current portion of the machine, said windings being placed on the stator.

The secondary winding FW of the alternating current portion placed on the stator may be connected as a bi-polar winding and may be short-circuited along two axes $a_1-a_2$ and $a_3-a_4$ at right angles to one another, as is shown on the drawing for the sake of simplicity, or may be provided with a starting resistance in the well-known manner, in order to facilitate the starting. Said secondary winding serves, at the same time, as a four polar compensating winding for the continuous current portion. For this purpose the winding FW is at the points $a_2$ and $a_4$ connected in series with the continuous current portion of the converter. FL designates a four-polar field-winding for the continuous current portion of the machine placed on the stator and being fed from the exciter M which has a shunt field winding FM provided with a regulating resistance VM.

The continuous current machine is provided with a number of poles differing from that of the alternating current machine, in order that both machines shall be capable of working independently of one another. If, as in Fig. 1, the alternating current machine is bi-polar, the continuous current machine may suitably be four-polar; and if the alternating current machine is four-polar, the continuous current machine may suitably be bi-polar, and so on. The proportion between the numbers of poles of both machines may suitably be 1:2 or 2:1, the invention is, however, not limited to said relations. Therefore, each machine works independently of the other one, though provided with common stator- and rotor-cores, and the voltage of the continuous current may be controlled at will, as for instance by regulating the strength of field of the continuous current machine. For this purpose a regulating resistance may be used in the circuit of the field winding.

In Fig. 1 the direct current winding of the rotor is shown diagrammatically; it may be an ordinary winding, ring or drum, but if so the arrangement of the four brushes shown cannot be employed, and two only would be used. It is, however, easy to so arrange the winding AL that the four brush arrangement illustrated can be adopted, and to do this each coil which can be short-circuited, is so wound as to comprise four bars arranged in series, which bars are under the four direct current poles and accordingly under the two alternating current poles. A suitable lap winding and a suitable wave winding may be used, which differs from an ordinary winding by the omission of every second commutator bar, and obviously the same result can be obtained with an ordinary winding if half the brushes be omitted.

In Fig. 2 AW designates a single phase, bi-polar alternating current winding placed on the rotor and, by means of slip-rings $s_1$ $s_2$ and brushes $b_1$ $b_2$ connected with the terminals I, II of a single phase alternating current circuit. AL is connected as a four-polar continuous current armature winding also placed on the rotor and by a commutator and brushes $B_1$ $B_1$ and $B_2$ $B_2$ connected with terminals $L_1$ $L_2$ of a continuous current circuit.

$K_1$ $K_2$ designate commutating pole windings placed on the stator and connected in series with the continuous current armature circuit. FW may be connected as a bi-polar secondary winding placed on the stator and fed with continuous current from the exciter M when said machine runs as an auto-synchronous machine. The same winding is also used as a compensating winding for the four polar continuous current armature winding, and for this purpose the armature current is supplied at the points $H_1$ and $H_2$. The point $H_2$ is the zero point of a balancing transformer connected in the usual manner with the exciter M. The large arrows refer to the exciting current of the alternating current machine, and the small arrows to the compensating current of the continuous current machine. The former current may be regulated by regulating the voltage of the exciter or by simultaneous and equal regulation of the resistances $RW_1$ and $RW_2$. The secondary winding FW is directly short-circuited between the points $a_1$ and $a_2$ and, by the armature of the exciter M, between the points $a_3$ and $a_4$. FL indicates a four-polar continuous current field winding for the continuous current portion of the converter, and the said winding is fed from the exciter M.

In the machine shown in Fig. 3 the rotor windings AW and AL and the commutating pole windings $K_1$, $K_2$ are arranged in the same manner as in Fig. 2. The stator is likewise provided, on the one hand, with a secondary winding FW serving at the same time as a compensating winding for the continuous current portion of the converter, and on the other hand with a four-polar continuous current field-winding FL. The connection differs from that shown in Fig. 2 only in that the compensating current passes, on the one hand, directly from $a_4$ to the terminal $L_1$ and, on the other hand, from $a_3$ through the armature of the motor and the regulating resistance $RW_3$ to the terminal $L_1$.

In the machine shown in Fig. 4 AW is a four-polar three-phase, primary winding placed on the rotor, and AL is connected as a bi-polar, continuous current armature winding. K is a commutating pole-winding placed on the stator. FW is a three-phase secondary winding placed on the stator and serving at the same time as a compensating winding for the continuous current portion of converter. FL is a bi-polar field-winding provided with the regulating resistance RL and connected with the terminals $L_1$ and $L_2$ of the continuous circuit. The mode of operation will appear from the foregoing description.

The machine shown in Fig. 5 is provided with a rotor of the same construction as that shown in Fig. 4. The stator is provided with a divided secondary winding FW which is short-circuited, on the one hand, directly between the points $k_1$ $k_2$ and $k_3$ $k_4$ and, on the other hand, through the armature of the exciter between the points $k_5$ $k_6$. The winding FW serves at the same time as compensating winding for the continuous current portion of the converter, and for this purpose the said winding is connected in series with the continuous current circuit of the converter, substantially in the same manner as is shown in Fig. 2. FL is a bi-polar continuous current field-winding placed on the stator and fed from the exciter M. After starting, the converter is brought to synchronism by means of continuous current supplied to the secondary winding FW at the points $k_5$ $k_6$.

The sectional view shown in Fig. 6 of a machine constructed according to the present invention will be easy to understand by the aid of the reference characters thereon. A machine according to this invention need not necessarily be used as a converter for transforming alternating current to continuous current, but may also be used for converting continuous current into alternating current or as a double current generator for generating simultaneously continuous current and alternating currents.

Although the drawings show converters provided with a single-phase or three-phase alternating current portion, it is obvious that the invention is not limited to such a construction, but that the phase-number may be chosen at will.

I claim —

1. In a dynamo-electric machine operable as a motor-generator or a double current generator, the combination of an asynchronous alternating current machine and a continuous current machine having different numbers of poles and common stator and rotor cores, the primary winding of the asynchronous machine being disposed on the rotor and the secondary winding being disposed on the stator, the latter winding being provided with short-circuiting connections corresponding with the number of poles of the alternating field, and being connected in series with the armature windings and the leads of the continuous current machine to constitute a compensating winding therefor, substantially as and for the purpose set forth.

2. In a dynamo-electric machine serving as motor-generator or as double current generator, the combination of an alternating current machine and a continuous current machine having different numbers of poles and common rotor and stator cores, the primary winding of the alternating machine being disposed on the rotor and the secondary winding being disposed on the stator, the latter winding being provided with short-circuiting connections corresponding with the number of poles of the alternating field, and being connected in series with the armature windings and the leads of the continuous current machine to constitute a compensating winding therefor, and means for exciting the latter winding for synchronous speed, substantially as and for the purpose set forth.

In testimony that I claim the foregoing as my invention, I have signed my name in presence of two subscribing witnesses.

JENS LASSEN LA COUR.

Witnesses:
JOHN DELMAR,
K. E. WIBERG.